(12) United States Patent
De Souza et al.

(10) Patent No.: US 7,754,186 B2
(45) Date of Patent: *Jul. 13, 2010

(54) OXIDES EXTRACTED FROM VEGETAL MATTER AND PROCESS THEREFOR

(75) Inventors: Milton F. De Souza, Sao Carlos (BR); Paulo Dos Santos Batista, Sao Carlos (BR); Jefferson B. L. Liborio, Sao Carlos (BR)

(73) Assignee: Fundacao de Amparo a Pesquisa do Estado de Sao Paulo, Sao Paulo (BR)

( * ) Notice: Subject to any disclaimer, the term of this patent is extended or adjusted under 35 U.S.C. 154(b) by 107 days.

This patent is subject to a terminal disclaimer.

(21) Appl. No.: 12/106,719

(22) Filed: Apr. 21, 2008

(65) Prior Publication Data

US 2008/0193364 A1 Aug. 14, 2008

Related U.S. Application Data

(62) Division of application No. 10/468,220, filed on Feb. 12, 2004, now Pat. No. 7,572,433.

(51) Int. Cl.
*C01B 33/00* (2006.01)
(52) U.S. Cl. ............... 423/659; 423/335; 423/658.5
(58) Field of Classification Search .......... 423/659, 423/1, 335, 658.5
See application file for complete search history.

(56) References Cited

U.S. PATENT DOCUMENTS 4,230,765 A * 10/1980 Takahashi et al. ...... 428/292.1

6,375,735 B1 * 4/2002 Stephens et al. ........... 106/600
2002/0114853 A1 * 8/2002 Krasutsky et al. ......... 424/725

FOREIGN PATENT DOCUMENTS

| CN | 111 3216 A | 12/1995 |
|---|---|---|
| CN | 1 229 057 | 9/1999 |
| DE | 276 671 | 3/1990 |
| EP | 514633 | * 11/1992 |
| RU | 2061656 | 6/1996 |
| WO | 00/77066 | * 12/2000 |

OTHER PUBLICATIONS

Real et al. "Preparation of Silica form Rice Husks", pp. 1-5, J. Am. Ceram. Soc. 79 (8) 2012-12 (1996), US.
Chapelle, "Action of Slag Calcic Sulphates on Pozolanes", Chapter IV, Published by the Studies and Research Center for the Industry of Hydraulic Connections, 1958, France.
Webb et al., "Analytical Methods in Fine Particle Technology", Copyright 1997 by Micromeritics Corp., pp. 1-301.

* cited by examiner

*Primary Examiner*—Steven Bos
(74) *Attorney, Agent, or Firm*—John A. Merecki; Hoffman Warnick LLC

(57) ABSTRACT

The invention concerns a process for the extraction of acid or basic oxides contained in a vegetal matter, more specifically it concerns the extraction of silica from rice husks. The invention also concerns pure oxides extracted from vegetal matter. The invention also concerns the process for the extraction of carbon-rich oxide compositions from vegetal matter, and compositions obtained through said process.

6 Claims, No Drawings

OXIDES EXTRACTED FROM VEGETAL MATTER AND PROCESS THEREFOR

CROSS-REFERENCE TO RELATED APPLICATIONS

This application is a Divisional application of patent application Ser. No. 10/468,220, filed Feb. 12, 2004, now U.S. Pat. No. 7,572,433 entitled "Oxides Extracted from Vegetal Matter and Process Therefor," which is hereby incorporated by reference.

The present invention concerns pure oxides (acid or basic oxides) extracted from vegetal matter, as well as carbon-rich oxide compositions extracted from vegetal matter. Another aspect of the invention concerns a process for the extraction of oxides contained in vegetal matter; more specifically it provides a process for the extraction of silica from rice husks or from the rice plant.

The description that follows makes reference to a preferred embodiment of the invention, namely the extraction of silica from rice husks. This is done simply to favor the understanding of the invention, without imposing any limitation to the scope of the invention, defined in the attached claims.

Amorphous silica, $SiO_2$, under its non-crystalline form, is a substance that has many uses. Its commercial value is strongly tied to its purity, specific area and particle size. Particles between 10 and 1000 nm (nanometers) are know as nanoparticles, and due to their small radius have high chemical reactivity and sinterization capacity.

Among the known processes for obtaining amorphous silica are the reaction between silicon monoxide, SiO and oxygen, and the mere burning of rice husks by the grain companies. This last case leads to a product known as rice husk ash.

The ash from the burning of rice husks contains high content of black carbon, about 60% by weight of silica, and some impurities mainly potassium, sodium, magnesium and calcium. The elimination of the carbon from this mixture to obtains high purity silica requites the use of high temperatures, a procedure that leads to BET specific areas of about 10 $m^2/g$ and average particle size above 50 µm. The dry rice husk mass corresponds to about 20% of the in natura grain, a variable value according to the plant variety, the climate, and agricultural procedures employed with the plant culture.

Rice husks comprise mainly cellulose, lignin, hemicellulose, silica and other inorganic oxides, these last ones representing about 4.5% of the silica mass, potassium and calcium having the highest content. Such values depend on the plant variety, climate and rain distribution.

Known in the state of the art is a process for the extraction of silica from rice husk developed by Real et. ali. (C. Real, M. D. Alcalá and J. M. Criado, "*Preparation of Silica from Rice Husks*" *J. Am. Ceram. Soc.* 79 [a] 2012-12 (1996)). Such a process consists of boiling the rice husks for two hours in a 10% hydrochloric acid distilled water solution, under ambient pressure, at a temperature of no more than 100° C. The husks axe then washed with distilled water to eliminate salts and compounds of potassium, sodium, calcium and magnesium that contribute to the later aggregation of particles of amorphous silica during calcination. Calcination at 600° C. follows, during an unknown amount of time, resulting in a white, amorphous and free from carbon silica, with a low content of other inorganic compounds, specific area of 260 $m^2/g$, a non specified particle size, but found to be between 15 and 20 µm by the inventors of the present invention.

The present invention has as an object an efficient, simple and cheap industrial process for extracting the oxides contained in vegetal matters. In a preferred embodiment, the process refers to the extraction of acid oxides.

Another object of the invention are carbon-rich oxide compositions extracted from vegetal matters. Still another object of the invention are highly pure oxides extracted from vegetal matters.

These and other objects of the present invention are better understood by means of the text and examples that follow, the scope of the invention being limited only by the content of the claims appended hereto.

The process of the present invention comprises some or all of the following steps:
  A. Hydrolysis of the vegetal matter (acid hydrolysis for the extraction of acid oxides, basic hydrolysis for the extraction of basic oxides), at a temperature above 100° C., under pressure;
  B. Washing/drying
  C. Fragilization of the structure;
  D. Disaggregation of the structure;
  E. Calcination;
  F. Milling More details are now presented, concerning a preferred embodiment of the invention, not in any way limiting the scope of the invention. It concerns the process for the extraction of silica from rice husks, as well as carbon rich oxide compositions and pure silica extracted from vegetal matter.

A. Acid hydrolysis—accomplished under the following preferred conditions, without the exclusion of any other:
  temperature range: 100° C.-200° C.;
  pressure above 2 atmospheres;
  acid used—sulfuric, hydrochloric or nitric, or their mixture;
  aqueous acid solution: 3% to 5% of acid, in weight;
  hydrolysis time: 30 minutes to 2 hours;
  ratio between weight of vegetal matter to weight of acid solution: 2:1 to 1:4.

During the hydrolysis potassium, sodium, calcium, magnesium and other inorganic impurities react with the acid forming, for instance, soluble sulfates with the sulfuric acid. Also during the hydrolysis the acid decomposes the hemicellulose.

When the process of the invention aims at obtaining basic oxides, the hydrolysis is a basic hydrolysis, and the preferred conditions remain the same, except that alkali is used instead of acid, and the preferred alkali are ammonium hydroxide, potassium hydroxide and sodium hydroxide, or their mixture.

B. Washing/Drying

The resulting material from the hydrolysis is washed with water, in one or more operations aimed at this end, depending on the desired purity of the silica. One aims at the removal of soluble salts and the decomposed hemicellulose. One can use soft water—that is, with low salt content—, distilled water or deionized water. The purity of the silica, as obtained at the end of the process depends on the efficiency of the soluble salt removal generated in the previous step, avoiding the presence of salts of basic character which later, during the step of calcination, form silicates that favor the sinterization of the silica—from this angle the use of hard water is less adequate. Some preferential conditions during washing are as follows:
  the washing operation starts with potable water and ends with distilled or deionized water;
  the washing operation is performed until the pH of the resulting waters is about 6;
  a larger number of washing actions with smaller amounts of water is preferred to a smaller number of washing actions with lager amounts of water.

At this stage one also performs, before going on to the next steps, the elimination of excess water from the washed material, for instance by filtration and/or drying, in any of the ways known to one skilled in the art.

It has been verified that the use of potable water provided silica with BET specific area up to about 260 m$^2$/g, while the use of distilled or deionized water considerably increased such BET area to values above 480 m$^2$/g.

BET (after Brunauer, Emmett e Teller) refers to a measure according the description by Paul A Webb, P. A and Orr, C, in *Analytical Methods in Fine Particle Technology*, edited by Micromeritics Instrument Corporation (One Micromeritics Drive, Norcross, Ga. 30093, USA ISBN 0-9656783-0-X).

C. Fragilization of the structure—this step aims at providing fragility to the obtained material, making its later disaggregation easy and efficient, also allowing the calcination temperature to be lower (compared to the absence of this step) as part of the organic material begins to decompose here, under gaseous form. Such gases can be utilized as fuel in later steps of this process, for instance during calcination.

An efficient fragilization means is the exposure to heat between about 270° C. and the temperature just below the flash point, or flame forming temperature of the vegetal matter from the prior step (ordinarily between about 410° C. and 430° C.), for about two hours, or until a deep dark color is obtained, or until the material becomes brittle or easily breakable. Typically, the temperature of this step is about 320° C. The time necessary to perform this step depends of the husk heating process, being shorter when the husks are carried by a flux of hot air.

The fragilization step renders easier the later milling operation, and allows the use of lower temperatures during the later calcination operation (compared to the temperatures used in the absence of the step of fragilization).

D. Disaggregation—the material originated from the previous step can be easily disaggregated by any adequate physical, physico-chemical or chemical action. It is typically a mechanical operation, such a milling, advantageously under dry conditions. It was verified to be adequate, without excluding any alternative, a dry milling with 5 mm diameter ceramic spheres, providing a fine powder with average diameter particle passable through a 325 mesh tamis or smaller. Also adequate are devices with mechanical or ultrasound vibrating means, crushing means, grinding means, or any equivalent means capable of performing disaggregation.

This disaggregation operation contributes to inhibit the aggregation of the silica in a later calcination step.

For some industries the resulting material from this step is useful, namely a composition essentially comprising carbon and silica, in a ratio of about 60:40. A example is the tire industry, as the rubber composition commonly comprises both carbon black and silica. This composition also finds uses in the cement industry, paint industry, etc.

Performing steps C and D sequentially is advantageous as they favor a finer particle size, compared to the alternative when one or the other is absent.

E. Calcination—it seeks to eliminate the organic part in the vegetal residue with the lowest possible temperatures, or with the shortest residence times of the dust in the calcination equipment. The higher the calcination temperature, the greater the undesired aggregation of the silica particles, mainly if alkaline or alkaline-terrous impurities are present. The preferred calcination temperature is between the flash point of the husk (between about 410° C. and 430° C.) and about 800° C., more specifically between about 440° C. and 850° C., and more advantageously between 500° C. and 650° C. An adequate form of calcination is the continuous burning of the dust injected along with fuel in the flame of a blast burner or blowpipe, directed to the interior of the burning chamber to accomplish the burning in the shortest possible time. One aims at obtaining a white silica dust at the lowest possible temperature that is capable of eliminating all carbon; from another angle, when the final product is white, one knows that the organic content has been substantially eliminated. When one burns the material obtained according to the previous steps, one favors the direct provision of an amorphous silica dust of high specific area, low aggregation and low average particle size, of about 5 µm.

Other adequate ways to perform the calcination is by using a fluidized bed oven, a rotary oven as the ones presently employed to burn ceramic dusts, a muffle type furnace with shallow crucibles, etc.

F. Milling—this step aims at providing the adequate finer particle size to the amorphous silica, as required—to specific needs. It includes any operation that decreases the particle size obtained in the previous steps. It can be by wet means—for instance a ball mill with a deflocking agent—or by dry means, for instance by the chock of opposing jets, an impact rotary mill with particle size selection, a ball mill with continuous sweep of the fine fraction, etc.

One of the advantages of the process of the invention is, by comprising the steps of fragilization and disaggregation, permiting a lower use of energy during calcination, if compared to either the traditional direct burning of rice husks or to the process revealed by Real, Alcalá and Criado, previously mentioned. Furthermore, the use of higher pressures during the hydrolysis step permits a shortened hydrolysis time and the use of a lower acid content solution, favoring—or at least not decreasing—qualities such as purity, BET specific area and small particle size in the final product.

One of the processes of the invention is the one that comprises steps A, B, C, D and E described before, for obtaining high purity (above 99%) amorphous silica, with particle size between about 1 to 6 µm, high specific area above at least about 260 m$^2$/g, and high chemical reactivity.

Another process of the invention is the one that comprises steps A, B, C, B, E and F, through which one obtains amorphous silica with particle size below 1 µm.

Another process of the invention is the one that comprises alternatively steps A, B, C and E, or A, B, D and E, either one optionally followed by step F, for obtaining high purity amorphous silica.

Another aspect of the invention is a high purity oxide, preferably silica, extracted from vegetal matter according to any of the processes mentioned hereinbefore.

Another process of the invention is the one that comprises steps A, B and C for obtaining carbon-rich oxide compositions, optionally followed by steps D and/or F.

Another aspects of the invention is compositions comprising essentially carbon and silica, obtained through a process according to steps A, B and C, optionally followed by steps D and/or F.

Examples will now be given, only as illustrations of the invention, to facilitate its understanding.

Three batches identified as 1, 2 and 3, each with 80 kg of rice husks of different origins are subject to the following steps:

A. Hydrolysis
    batches 1 and 2-4.5% sulfuric acid aqueous solution, using a 1:1 ratio between the weights of husks and acid solution, pressure of 5 atmospheres, temperature of 150° C., during 1 hour.

batch 3-5% hydrochloric acid aqueous o, using a 1:1 ratio between the weights of husks and acid solution, pressure of 7 atmospheres, temperature of 170° C., during 2 hours.

B. Washing/Drying batches 1 and 2—potable water, in a container provided with filtration means, 30 liter portions for each washing action under agitation, until the resulting waters have a pH of about 6, followed by drying during 1 hour at 120° C. in a muffle type oven.

batch 3—the same as for batches 1 and 2, including two extra 30 liter distilled water washing actions.

C. Fragilization all batches—heating to 320° C. during 60 minutes, with the material disposed in thin layers inside crucibles, in a muffle type oven.

D. Disaggregation all batches—dry milling in a rotary mill with 6 mm diameter zirconia spheres, for 8 hours. The material obtained is a deep dark powder with average particle size below 44 μm.

E. Calcination batches 1 and 2—temperature 550° C. in a fluidized bed oven, residence time 2 hours.

batch 3—temperature 500° C. in a fluidized bed oven, residence time 2 hours.

F—Milling batches 1 and 2—milling with 5 mm diameter zirconia spheres, in a wet medium with 2% in weight of ammonium polyacrylate as deflocking agent, for 2 hours.

batch 3—same as with other batches, for 6 hours.

RESULTS

The table below shows the results:

| Batch | color and % purity in $SiO_2$ | particle size (μm) | specific area (BET $m^2/g$) | (*) % average Pozolanicity |
|---|---|---|---|---|
| 1 (before step F) | white, 99.2 | 5 | 260 | 90 |
| 1 (after step F) | white, 99.2 | 1 | 260 | 90 |
| 2 | white, 99.6 | 0.8 | 280 | 90 |
| 3 | white, 99.8 | 0.7 | 420 | 99 |

(*) According to the process described by Chapelle, J. in Revue de Matériaux de Construction, vol. 512, pages 136 and following, 1958, France.

The invention claimed is:

1. A process for the extraction of oxides contained in vegetal matter, to obtain carbon-rich oxide compositions, comprising the following steps:
   A. Acid hydrolysis of the vegetal matter at a temperature between 100° C. and 200° C., pressure above 1 atm, and acid concentration in water between 3% and 5% by weight;
   B. Washing and drying the hydrolyzed material resulting from step A;
   C. Fragilization of the dried material resulting from step B;
   D. Disaggregation of the fragilized material, if necessary; and
   E. Milling of the fragilized material, if necessary.

2. The process according to claim 1, to obtain carbon-rich acid oxide compositions, the hydrolysis utilizing the following conditions:
   an acid selected from the group consisting of sulfuric acid, hydrochloric acid, nitric acid, and combinations thereof; and
   ratio between the weights of vegetal matter and acid solution from about 2:1 to about 1:4.

3. The process according to claim 1, wherein said washing step B is performed with water selected from the group consisting of: potable or soft water, distilled water and deionized water, until water resulting from the washing has a pH of about 6.

4. The process according to claim 1, wherein said fragilization step C is performed by exposure to heat between about 270° C. and the flame forming temperature or the flash point of the washed and dried material, about 320° C., for up to about 2 hours.

5. The process according to claim 1, wherein said disaggregation of the fragilized material of step D is a mechanical operation.

6. The process according to claim 5, wherein said mechanical operation is a dry milling operation.

* * * * *